(No Model.) 7 Sheets—Sheet 1.
W. E. ADAMS.
LEATHER SPLITTING MACHINE.

No. 378,158. Patented Feb. 21, 1888.

Witnesses.
H. H. Thompson.
J. A. Goodwin.

Inventor.
Wm E. Adams
by Wm A. Macleod
his Atty (No Model.)

7 Sheets—Sheet 2.

W. E. ADAMS.
LEATHER SPLITTING MACHINE.

No. 378,158. Patented Feb. 21, 1888.

Witnesses.
M. H. Thompson,
Matthew Clark.

Inventor.
Wm E. Adams,
by Wm A. Macleod
his Atty (No Model.)  7 Sheets—Sheet 3.

W. E. ADAMS.
LEATHER SPLITTING MACHINE.

No. 378,158.  Patented Feb. 21, 1888.

Witnesses.
H. A. Thompson.
J. A. Goodwin.

Inventor.
Wm. E. Adams.
by Wm. A. Macleod.
his Atty (No Model.) 7 Sheets—Sheet 5.
W. E. ADAMS.
LEATHER SPLITTING MACHINE.

No. 378,158. Patented Feb. 21, 1888.

(No Model.) 7 Sheets—Sheet 6.
W. E. ADAMS.
LEATHER SPLITTING MACHINE.

No. 378,158. Patented Feb. 21, 1888.

Witnesses.
Inventor.

(No Model.) 7 Sheets—Sheet 7.

W. E. ADAMS.
LEATHER SPLITTING MACHINE.

No. 378,158. Patented Feb. 21, 1888.

Witnesses.
H. A. Thompson
Matthew Clark

Inventor.
Wm. E. Adams,
by Wm. A. Macleod
his Atty

UNITED STATES PATENT OFFICE.

WILLIAM E. ADAMS, OF LYNN, MASSACHUSETTS.

LEATHER-SPLITTING MACHINE.

SPECIFICATION forming part of Letters Patent No. 378,158, dated February 21, 1888.

Application filed August 26, 1886. Serial No. 211,894. (No model.)

*To all whom it may concern:*

Be it known that I, WILLIAM E. ADAMS, of Lynn, county of Essex, State of Massachusetts, have invented certain new and useful Improvements in Leather-Splitting Machines, of which the following is a specification, taken in connection with the drawings accompanying and forming a part hereof, in which—

Figure 1:
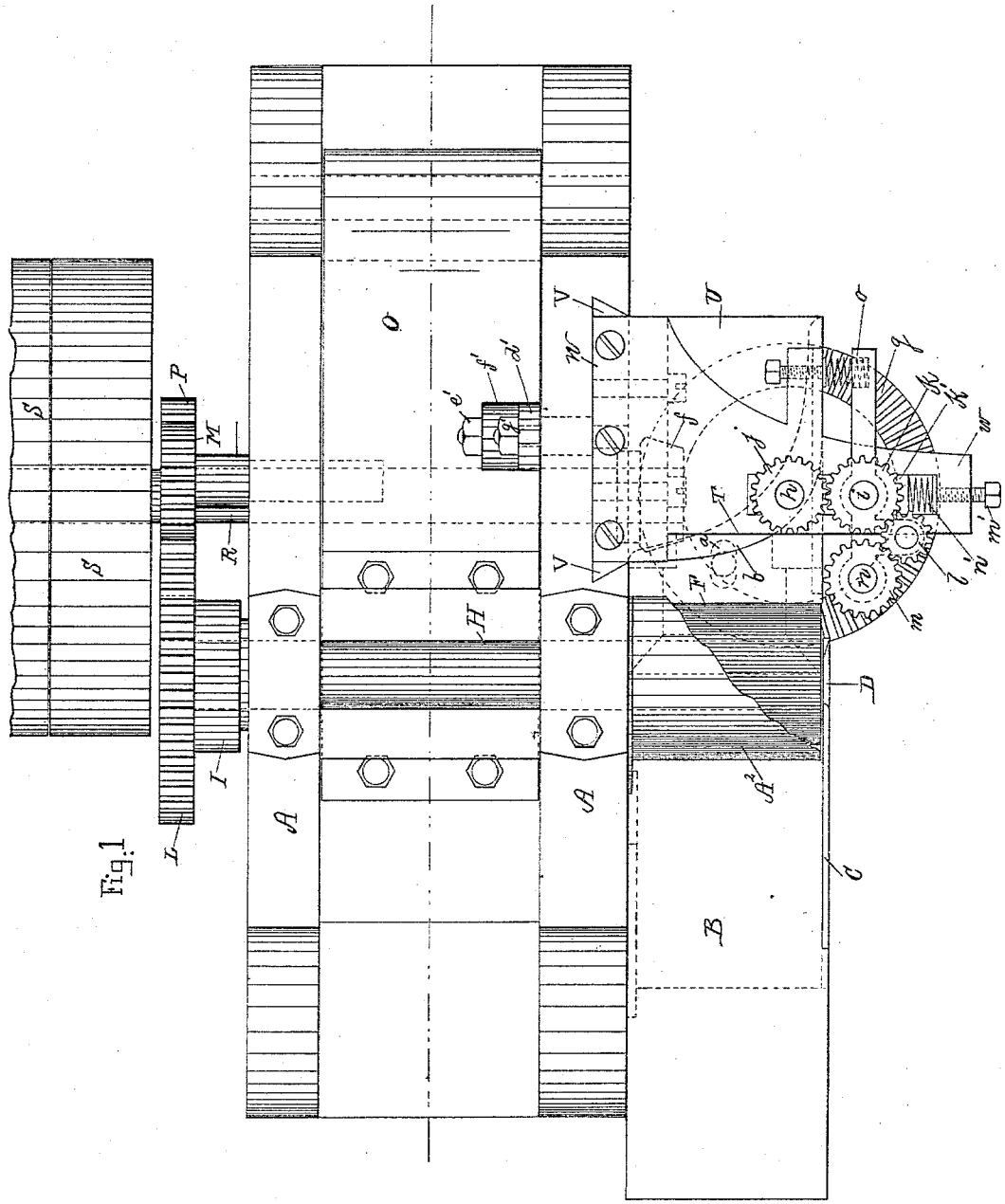
Figure 2:
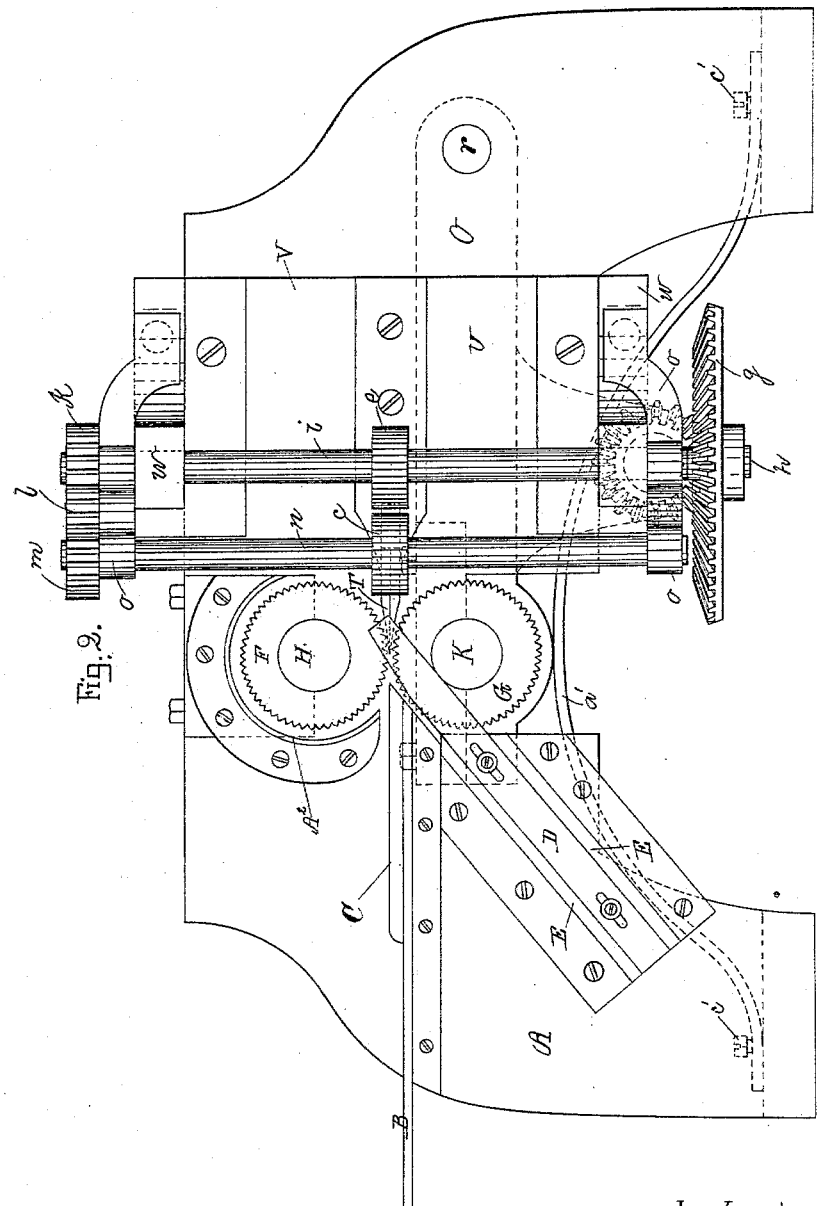
Figure 3:
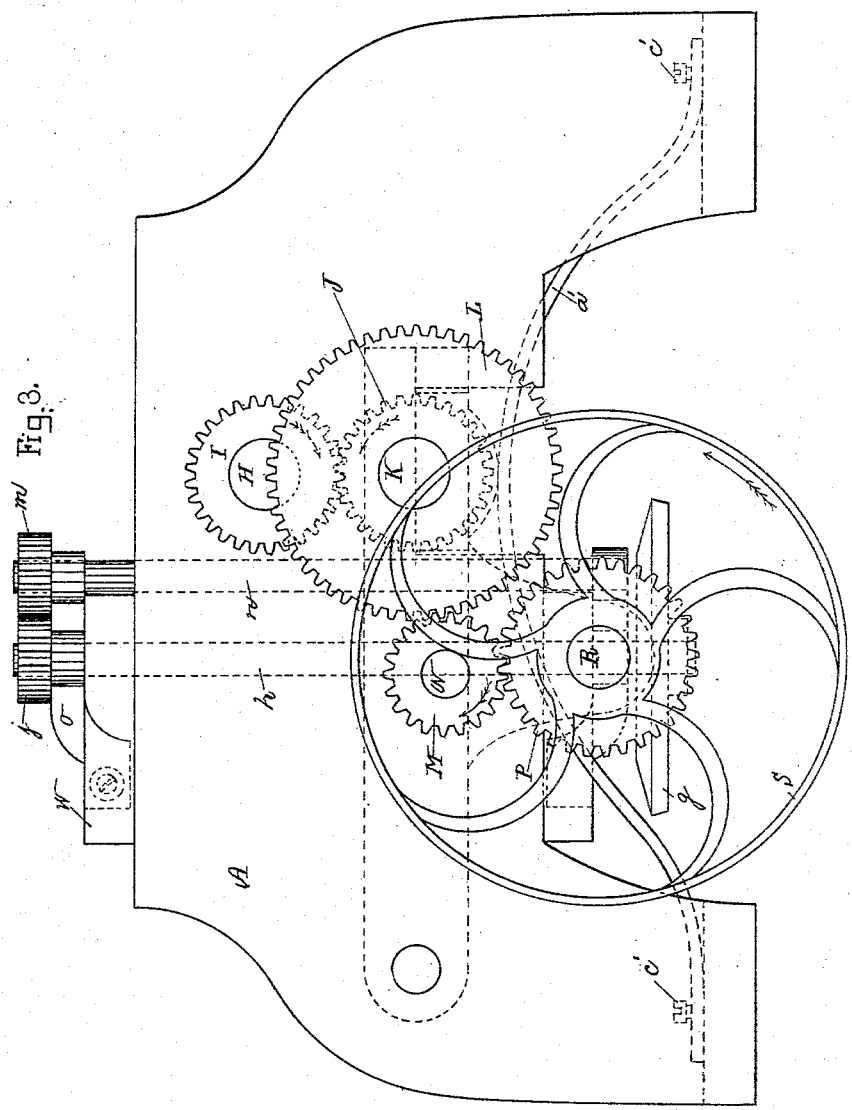
Figure 4:
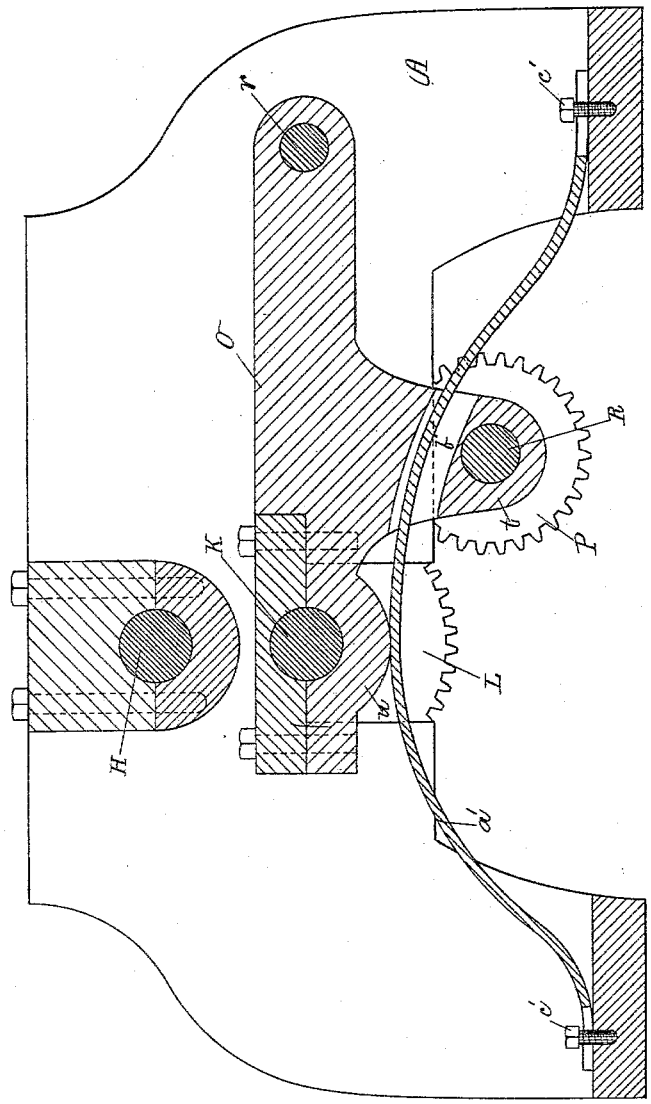
Figure 5:
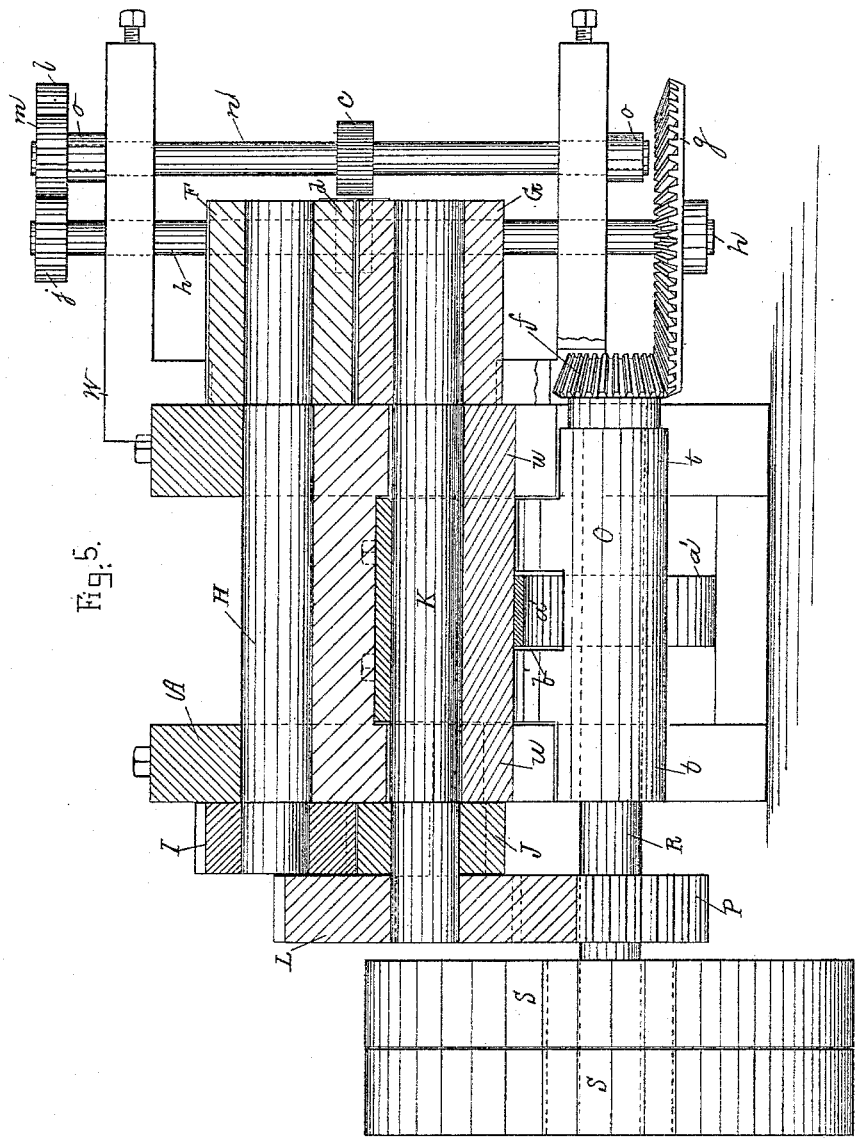
Figure 6:
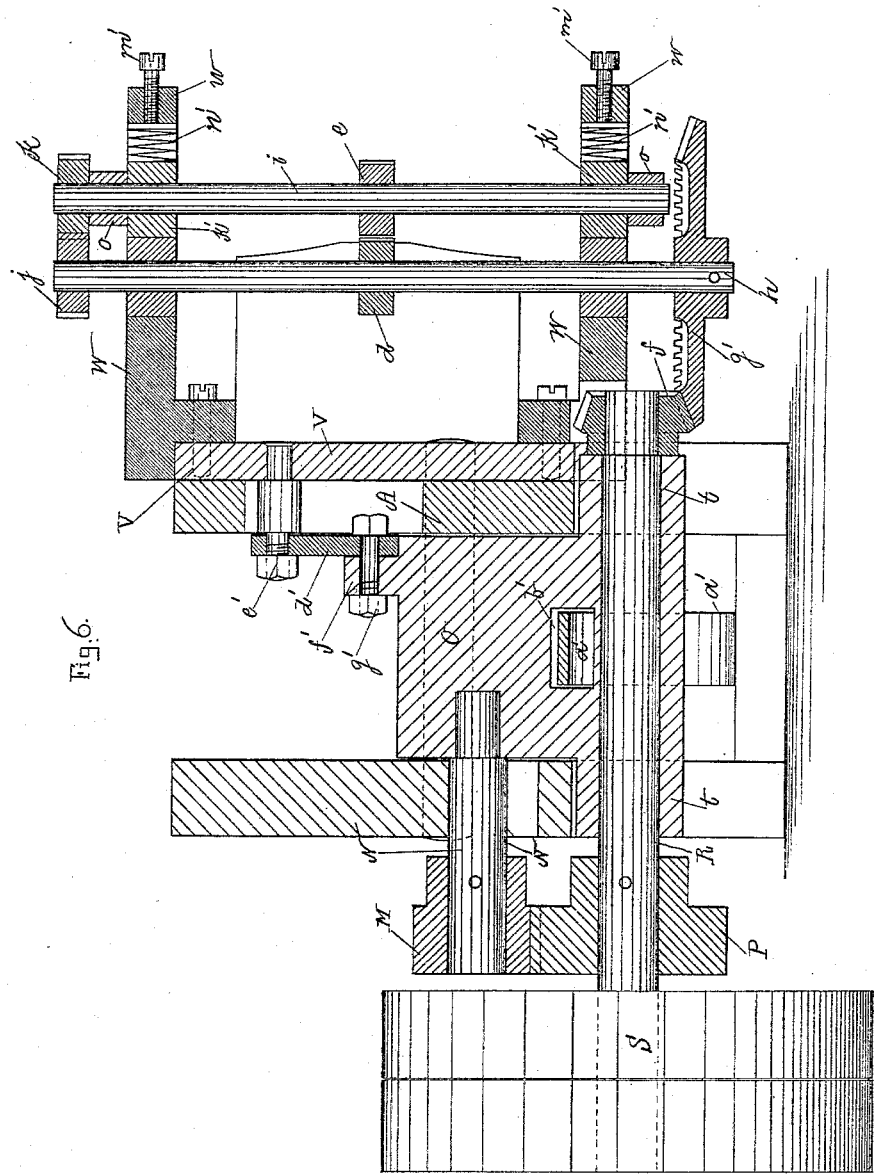
Figure 7:
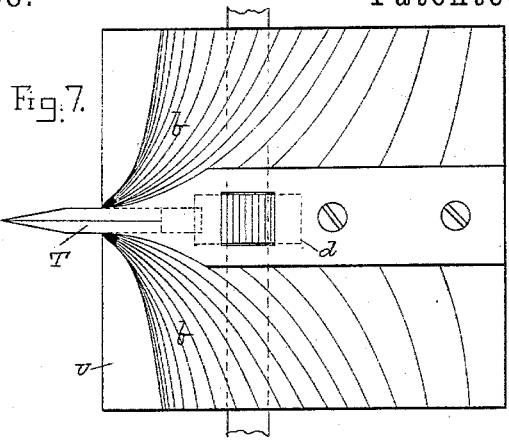
Figure 8:
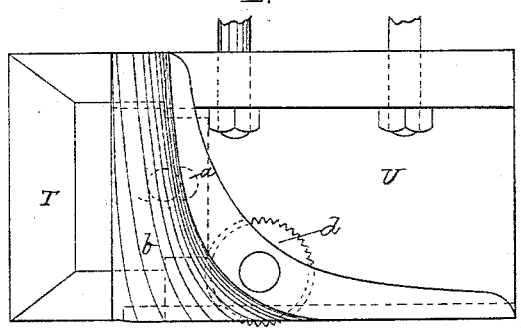
Figure 9:
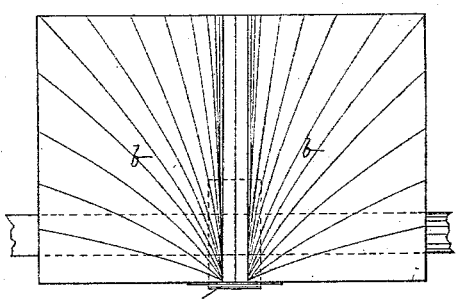
Figure 10:
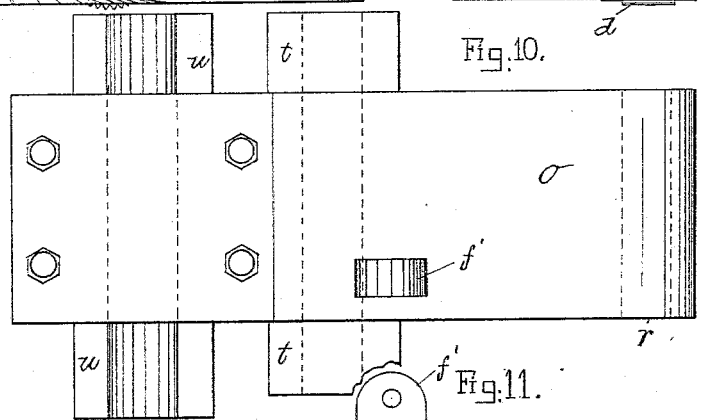
Figure 11:
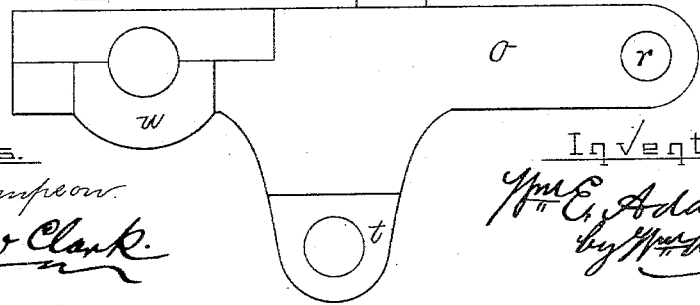

Figure 1 is a plan view. Figs. 2 and 3 are end elevations from the right and left of Fig. 1, respectively. Fig. 4 is a longitudinal central section on dotted line, Fig. 1. Fig. 5 is a transverse section of the machine through the feed-rolls. Fig. 6 is a similar section through the main shaft. Figs. 7, 8, and 9 are respectively a side view, a plan view, and a front view of the splitting-knife and opener-block. Figs. 10 and 11 are plan and side views, respectively, of the pivoted frame.

My present invention is an improvement on the machine shown and described in a previous application filed by me in the United States Patent Office, and now pending therein, as also upon machines constructed by George L. Tyler, which are shown and described in certain patents already granted to said Tyler for leather-splitting machines and also in certain applications filed by him for Letters Patent, which are still pending.

The chief object of my invention is the construction of a leather-splitting machine which shall be simpler and equally or more effective than any now known to me; and it consists in the peculiar arrangement and combination of the parts by which compactness and simplicity are gained, all as shown and hereinafter described and claimed.

The object of leather-splitting machines of this class is the splitting of small pieces of leather to a hinge at one edge of the piece and then spreading the flaps so formed into the same plane, so as to produce a single piece of leather having twice the area of the original unsplit piece and one-half or substantially one-half its thickness. When the pieces to be split are of irregular shape, as scrap pieces usually are, the piece must be trimmed before splitting to a straight edge at the side along which the hinge is to be left by the splitting-knife. To first trim the piece, therefore, then split it to a hinge at the straight edge, then spread the flaps of the split piece into the same plane substantially, and press and set them in this position are the objects for which my machine was constructed.

Like letters of reference indicate like parts throughout the drawings.

My invention will be readily understood from a description of the machine shown in the drawings, which embodies it.

A is the frame of the machine, to which is secured a table, B, upon which the stock is placed as it enters the machine. A guide or guard, C, projecting slightly above the level of the table, is secured at one side thereof, as shown at Fig. 1, the forward end of the guide projecting well in toward the nip of the feed-rolls, as shown in Fig. 2.

The trimming-knife D is secured obliquely to the frame of the machine, and so as to bring its cutting-edge directly in line with the inner face of the guide C and opposite the end of the feed-rolls. The manner of securing the knife D in place is not essential; but I prefer to dovetail it between guide-pieces E, so that as the knife is ground it may be moved upward and readjusted.

For the purpose of feeding the stock forward past the trimming-knife and onto the splitting-knife, I provide corrugated feed-rolls F G. The upper feed-roll, F, is mounted on a shaft, H, which is journaled in the frame of the machine, (see Fig. 5,) and is provided at the end opposite the feed-roll with a gear, I, which is in mesh with the gear J on the shaft K of the lower feed-roll, G. Outside the gear J on shaft K is secured a large gear, L, which meshes with the intermediate gear, M, (see Fig. 3,) mounted on a spur, N, (see Fig. 6,) which is set in the movable pivoted frame O of the machine. The gear M meshes in turn with a gear, P, fast on the main shaft R, which carries the driving-pulleys S, and which is journaled in the lower portion of the movable frame O. By means of this mechanism the feed-rolls F and G are actuated.

Directly behind the feed-rolls and projecting well in between them is the splitting-knife T, which is of the shape shown in Figs. 7 and 8, and which is secured to a suitable table or support, U, which is secured to a vertically-sliding block, V, hereinafter described. The knife T is secured to the table U by means of a slot, a, and screw-bolt, so that it may be adjusted toward or from the rolls when desired, and it is so set that its outer edge next the trimming-knife D lies inside the trimming-knife, and thus the flaps or halves of the split piece are not wholly severed from each other, but an unsplit margin, forming a hinge, is left along the straight side of the piece. On the block or table U is also secured an opener, b, (see Figs. 7, 8, and 9,) into a slot in which the shank of the knife is set, and which flares rearwardly from the knife edge or face, so as to gradually open or spread the flaps of the piece of leather as the leather passes the knife and is carried onto the opener and bring these flaps or halves into the same plane. In order to render it more certain that small pieces of stock will pass onto the opener, I have arranged a feed-roll, c, mounted and actuated, as hereinafter described, so as to bear against the stock immediately after passing the edge of the splitting-knife and feed it over the opener and between the pressing-rolls d e, which act to press out the hinge of the split piece and set the flaps or halves thereof in the same plane. As will be obvious, the feed-roll c may be omitted if pieces of comparatively large size only are to be split; or the rolls d e may be set somewhat nearer to the edge of the splitting-knife, in which latter case the feed-roll c may not be essential.

The rolls c d e, for feeding and pressing the split stock, are mounted and actuated as follows: On the end of the main shaft R, opposite the driving-pulley S, is secured a beveled pinion, f, which meshes with the beveled gear g, mounted on shaft h. (See Figs. 2 and 6.) The shaft h is mounted in supports W, projecting from and secured to the vertically-sliding block V, and it carries the corrugated presser-roll d in a slot in the opener b, which acts with its companion roll e, mounted on shaft i, to press the hinge of the split piece and set the flaps in the same plane. The upper end of shaft h is provided with small gear j, which meshes with a companion gear, k, fast to shaft i. The shaft i is mounted in sliding journal-boxes k', Fig. 6, set in the projections W, and by means of the adjusting-screws m' and springs n' the pressing and smoothing rolls may be set nearer to each other and the pressure on the stock increased. The gear k is in mesh with an intermediate gear, l, (see Fig. 1,) which in turn meshes with gear m, which is fast on shaft n, which carries the feed-roll c, heretofore referred to, which is opposed to the end of the splitting-knife and which acts upon the stock immediately after it passes the edge of the splitting-knife to feed it along over the opener and into the pressing-rolls d e. The shaft n is set parallel with the shafts i h, and is mounted in projections o, fast to the projections W. (See Fig. 2.)

The mechanism above described is sufficient for the purpose of trimming a piece of leather to a straight edge at one side, then splitting the piece to a hinge along the straight edge, and then spreading the flaps of the split piece and pressing and setting them in the same plane to form a flat piece having twice the area of the original unsplit piece. It will be apparent, however, that a machine of this kind must be adapted to split pieces of leather of varying thickness, as well as to split a single piece of leather which is thicker at one point than at another, and to split the piece centrally in each case; or, if the machine is so set as to form one flap or side of the split piece of one-third only of the entire thickness of the original piece, this proportion of one-third must be maintained through varying thicknesses of the stock. In order to accomplish this I have provided the movable support O, pivoted between the frame parts of the machine at r and of the shape shown, Figs. 10 and 11, and provided with bearings at t u for the main shaft, as also for the shaft of the lower feed-roll, G. This movable frame-piece O may swing vertically on the pivot r, and is supported at the forward end by contact with the springs a', (see Figs. 2 and 4,) which rest at either end on the bed of the frame A, being secured to said bed by screw-bolts c', which pass through slots in the ends of the spring, as shown, Fig. 4, and thus permit of its depression. The spring a' bends upwardly in the middle portion and bears against the frame O directly underneath the bearing of the shaft of the lower feed-roll, the downwardly-projecting portion of frame O, which carries the main shaft, being slotted at b' to receive the spring a' and permit of its movement when depressed. When a piece of leather enters the feed-rolls F G, the upper feed-roll being stationary, the under roll yields to accommodate the thickness of the leather, and this it is permitted to do by reason of the fact that it is mounted in the movable frame O, which is supported at its forward end on the spring a'. If, now, the leather is to be split centrally, the edge of the splitting-knife must move downwardly one-half the distance of the lower feed-roll; or, in other words, it must move downwardly the same distance as a point midway between the axis of pivot r and the nip of the feed-rolls. To obtain this result the splitting-knife, as also the feed-roll and the presser-rolls and their operating mechanism, are mounted on the block V, (see Fig. 6,) which slides vertically in a dovetail in frame A, (see Fig. 1,) and is actuated in its vertical movement by means of a link, d', (see Fig. 6,) pivoted at its upper end to the block V at e' and at its lower end at g' to a lug, f', projecting from the top of frame O. The pivot g' is located on frame O midway between the pivot r and the nip or axis of the feed-rolls. It will be obvious that by this arrangement the position of the splitting-knife in the stock is always relatively the same whether the stock be thick or thin. Since all the working parts of the machine, except the upper feed-roll, are mounted in the movable frame O, they are always in adjustment with the knife, and since the downward movement of the lower feed-roll is in any event comparatively slight it is not sufficient to disengage the gear I of the upper feed-roll, which is stationary, from the gear J of the lower feed-roll, which moves with the frame O.

A² is a protecting guard for the upper feed-roll. It is shown partly broken away in Fig. 1.

What I claim is—

1. A leather-splitting machine having two feed-rolls, one of which is movable from and toward the other, a trimming-knife at the end of said feed-rolls, a splitting-knife set behind said rolls on a movable support and located inside said trimming-knife, thereby leaving a space between its outer end and the trimming-knife, an opener secured to the knife-support, and pressing-rolls which operate on the leather after it has passed the splitting-knife, substantially as described.

2. In a leather-splitting machine, the combination of a splitting-knife and opener mounted on a movable block and pressing-rolls journaled in supports also mounted on said movable block, substantially as shown and described.

3. A leather-splitting machine having the splitting-knife, opener, a feed-roll for feeding the split piece onto the opener, and two pressing-rolls, all mounted on a movable block, whereby, when the position of the knife is changed by varying thicknesses of leather, the parts which operate upon the leather after it passes the edge of the splitting-knife will move with the knife, substantially as set forth.

WILLIAM E. ADAMS.

Witnesses:
WM. A. MACLEOD,
M. A. THOMPSON.